(No Model.)
G. M. GITHENS.
PACKING FOR ROCK DRILLING ENGINES.
No. 517,690. Patented Apr. 3, 1894.
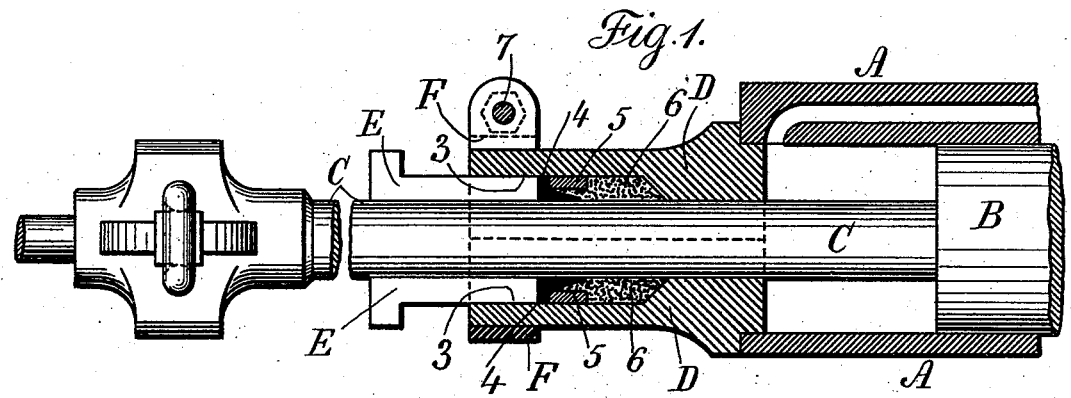
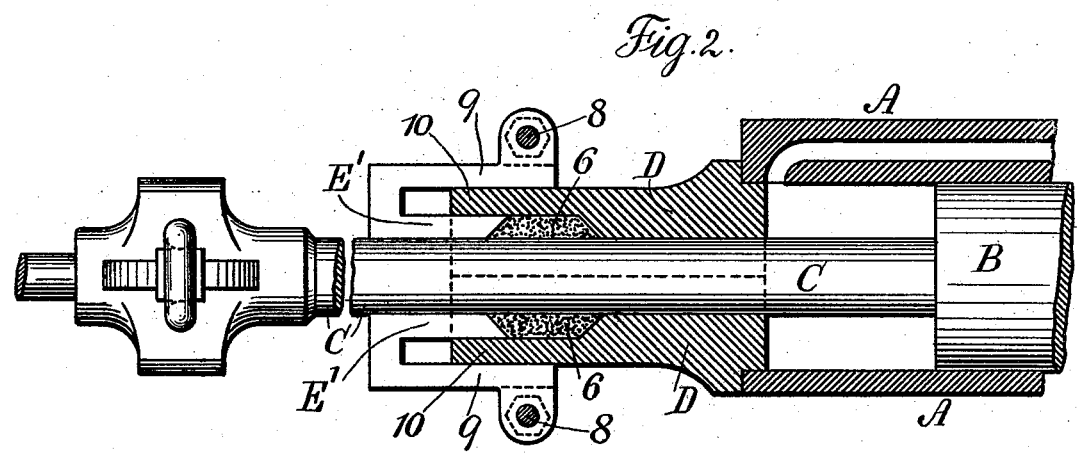
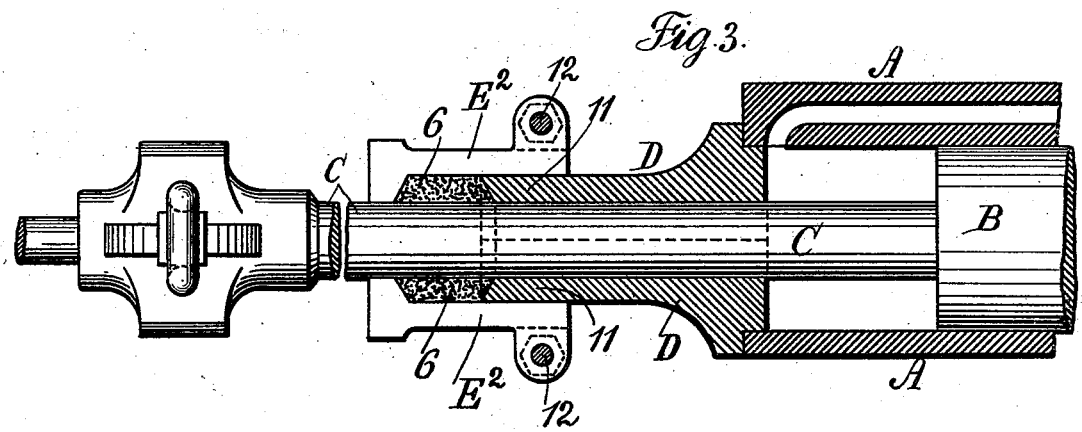
Witnesses:
J. Stait
Chas. H. Smith
Inventor:
George M. Githens
Lemuel W. Serrell
Atty.

UNITED STATES PATENT OFFICE.

GEORGE M. GITHENS, OF BROOKLYN, NEW YORK.

PACKING FOR ROCK-DRILLING ENGINES.

SPECIFICATION forming part of Letters Patent No. 517,690, dated April 3, 1894.

Application filed July 31, 1893. Serial No. 481,915. (No model.)

*To all whom it may concern:*

Be it known that I, GEORGE M. GITHENS, a citizen of the United States, residing at Brooklyn, in the county of Kings and State of New York, have invented an Improvement in Packings for Rock-Drilling Engines, of which the following is a specification.

The piston rod in rock drilling engines receives at its end the drill, a clamp stock or holder for the drill being formed upon the end of the piston rod. This usually necessitates the construction of a cylinder head in two parts placed at opposite sides of the piston rod and inserted slightly into the end of the cylinder and held by bolts, and in order to make a tight joint around the piston rod, a packing has been introduced; sometimes the same has been of fibrous material and in other instances of leather similar to a hydraulic packing, but difficulty has arisen in securing the packing so that the same does not become leaky in consequence of the rapid vibration of the piston rod through the packing, and in consequence of the concussion often occurring of the piston against the inner end of the cylinder head. It will be apparent that where a packing gland is made use of with a screw cap for holding the packing in place or where this cap is screwed on by bolts, the sharp blow or concussion of the piston against the inner end of the cylinder head serves to loosen the hold of the screw or screws because the inertia of the outer member causes the same to remain momentarily quiescent as the head is driven toward that outer member by the blow upon its inner end; the consequence is that the packing or packing gland rapidly becomes loose, and in cases where leather, similar to a hydraulic packing, is made use of, the steam or air under pressure passes around the disk or flange portion of such packing, even though the packing may remain tight around the piston rod, and in cases where rubber or fibrous material is made use of for the packing the same allows the fluid under pressure to pass through because the follower or outer member of the packing gland is not kept closely to its place in consequence of the loosening of the screws by the concussion.

The object of my invention is to avail of the concussion of the piston against the inner end of the cylinder head as a means for setting up or tightening the follower or outer member of the packing gland, and in carrying out this improvement I prefer and use the devices hereinafter described and claimed.

In the drawings, Figure 1 illustrates a portion of a cylinder for a rock drilling engine and one form of packing made use of by me. Figs. 2 and 3 are sectional views of modifications of the said packing.

The cylinder A, piston B, piston rod C and cylinder head D are to be of any desired character, and as before mentioned, in a rock drilling engine the cylinder head D is usually formed in two parts divided longitudinally and centrally in order that the head may be placed around the piston rod, the piston and the head for holding the drill being integral; and I remark that although this improvement is specially available with a rock drilling engine, I do not limit myself in this particular, as my improvement in packing devices may be made use of in a direct acting pump or in any similar device in which the inner end of the head is liable to concussion by a piston.

The cylinder head D is secured to the cylinder A in any usual manner. In my Patent No. 457,348 I have represented longitudinal bolts as extending from the front head to the back head of the engine cylinder.

In Fig. 1, I have represented the follower E as passing into the cup or cylindrical recess 3 in the cylinder head D, and a cup-leather or hydraulic packing is represented at 4 around the piston rod C and adjacent ring 5 of metal, and a packing 6 of fibrous material in the cylindrical recess of the packing gland. These packing materials being well known may be varied without departing from my invention.

The follower E instead of being screwed in as usual is made cylindrical and simply driven into place, and the extent of friction for holding the follower in place may be varied by tightening or loosening the clamp screw 7 of the divided collar F, which divided collar surrounds the neck or cylindrical portion of the divided head D. It will now be apparent that the follower E is simply held by friction and that whenever the piston strikes a blow against the inner surface of the head D the follower E will be driven up by inertia, and in so doing the packing around the piston rod C will be set up or compressed to the extent of the movement of the follower E under the action of the concussion or blow against the inner end of the cylinder head, and by properly setting up the clamp screw 7 of the collar F, so the friction upon the follower will be greater or less and the movement of the collar by inertia and under the action of the concussion of the piston against the head, will be regulated.

In cases where the follower is made in the form represented in Fig. 2 with a cylinder surrounding the neck or cylindrical portion of the head D, such follower E' may be made in two parts held together by the screws 8, and by these screws the friction of the cylindrical portion 9 of the follower upon the exterior of the cylindrical neck 10 of the cylinder head D can be regulated so that the blows of the piston against the inner end of the cylinder head will set up the follower from time to time and keep the packing material 6 of the gland under the pressure which is necessary to keep the packing of the piston rod from leaking, and at the same time care must be taken to prevent the inertia and concussion setting up the follower so as to produce too great friction of the packing upon the piston rod.

If desired, the packing 6 can be at the end of the cylindrical portion 11 of the cylinder head D, as shown in Fig. 3, the follower $E^2$ surrounding such cylindrical portion 11 and being set up by the bolts 12 so as to produce whatever friction is necessary for holding the packing 6 in a properly compressed condition, such packing being set up from time to time by the movement of the follower under the action of a blow by the piston against the inner end of the cylinder head.

It will be understood that in cases where the piston rod is made separate from the piston and from the cross head or drill holding clamp, the cylinder head can be made in one piece and also the follower that applies pressure to the packing.

I claim as my invention—

1. The combination with a piston and piston rod, of a cylinder, a cylinder head through which the piston rod passes, a packing gland around the piston rod and a follower for the same held upon the cylinder head by friction so as to be set up from time to time and maintain the proper pressure upon the packing material by the blow or concussion of the piston against the inner end of the cylinder head, substantially as set forth.

2. The combination with the piston, piston rod, cylinder and cylinder head, of a packing around the piston rod, a follower for the packing or packing gland held in position by friction and adapted to being driven up to place from time to time for properly holding the packing material around the piston rod, substantially as set forth.

3. The combination with the cylinder, piston and piston rod, of a divided cylinder head surrounding the piston rod and having a cavity for the reception of packing material, a follower for holding the packing material with the required pressure, and a screw for regulating the friction of the follower upon the cylinder head and thereby holding the follower and the packing materials compressed by the same and allowing such follower to be set up by the concussion of the piston against the cylinder head, substantially as set forth.

4. The combination with the piston and piston rod in a rock drill or similar engine, of a divided head through which the piston rod passes, a packing gland and its follower surrounding the piston rod and the cylindrical portion of the head, and a screw to apply the friction necessary between the cylindrical portion of the cylinder head and the follower of the packing gland, substantially as set forth.

Signed by me this 28th day of July, A. D. 1893.

GEO. M. GITHENS.

Witnesses:
HAROLD SERRELL,
WILLIAM G. MOTT.